US008491706B2

(12) United States Patent
Bingham

(10) Patent No.: US 8,491,706 B2
(45) Date of Patent: Jul. 23, 2013

(54) OIL VAPOR CLEANER

(75) Inventor: Richard Bingham, Katy, TX (US)

(73) Assignee: M-1 L.L.C., Houston, TX (US)

( * ) Notice: Subject to any disclaimer, the term of this patent is extended or adjusted under 35 U.S.C. 154(b) by 408 days.

(21) Appl. No.: 13/003,786

(22) PCT Filed: Jul. 14, 2009

(86) PCT No.: PCT/US2009/050498
§ 371 (c)(1),
(2), (4) Date: Jan. 12, 2011

(87) PCT Pub. No.: WO2010/009096
PCT Pub. Date: Jan. 21, 2010

(65) Prior Publication Data
US 2011/0107791 A1    May 12, 2011

Related U.S. Application Data

(60) Provisional application No. 61/080,794, filed on Jul. 15, 2008, provisional application No. 61/107,592, filed on Oct. 22, 2008.

(51) Int. Cl.
*B01D 47/06* (2006.01)

(52) U.S. Cl.
USPC .......... 95/227; 55/434.2; 55/434.3; 55/459.1; 95/219; 95/220; 96/313; 96/314; 96/316; 96/319; 96/321

(58) Field of Classification Search
USPC ............... 55/337, 434.2, 434.4, 459.1; 95/32, 95/219, 220, 227, 271; 96/171, 200, 203, 96/209, 321, 336, 347, 313, 314, 316, 319
See application file for complete search history.

(56) References Cited

U.S. PATENT DOCUMENTS

| | | | | |
|---|---|---|---|---|
| 3,922,151 A | * | 11/1975 | Kiss et al. | 95/220 |
| 4,279,627 A | * | 7/1981 | Paul et al. | 96/316 |
| 4,864,942 A | | 9/1989 | Fochtman et al. | |
| 4,904,286 A | * | 2/1990 | Magol et al. | 55/434.4 |
| 4,944,250 A | * | 7/1990 | Seshamani | 122/20 B |
| 5,116,394 A | * | 5/1992 | Garkawe | 55/434.4 |

(Continued)

OTHER PUBLICATIONS

International Search Report and Written Opinion issued Jan. 13, 2011 in corresponding application No. PCT/US2009/050498 (12 pages).

(Continued)

*Primary Examiner* — Duane Smith
*Assistant Examiner* — Joubert X Glover
(74) *Attorney, Agent, or Firm* — Osha • Liang LLP

(57) ABSTRACT

An apparatus for recovery of solids from a vapor, the apparatus including: a vessel comprising a cylindrical portion on top of an angled portion; a vapor inlet located in the cylindrical portion for introducing a solid-vapor mixture tangentially to the cylindrical portion; at least one inlet nozzle disposed in a top of the vessel for spraying a hydrocarbon fluid into the vessel; an indirect heat exchange device disposed concentrically within the cylindrical portion, thereby providing an annulus for vapor and hydrocarbon flow; a heat exchange device disposed at an exterior of the angled portion; an outlet located at a bottom of the angled portion to recover the vapor having a reduced solids content and a solid-hydrocarbon mixture. Also disclosed are processes to clean an oil vapor using such an apparatus.

20 Claims, 5 Drawing Sheets

U.S. PATENT DOCUMENTS

| | | | |
|---|---|---|---|
| 5,766,314 A * | 6/1998 | Weber et al. | 95/220 |
| 6,399,851 B1 | 6/2002 | Siddle | |
| 6,425,931 B1 * | 7/2002 | Croggon | 55/414 |
| 6,547,960 B1 | 4/2003 | Yamauchi | |
| 2004/0139710 A1 * | 7/2004 | Illingworth et al. | 55/406 |
| 2004/0204308 A1 | 10/2004 | Kapila et al. | |
| 2005/0261530 A1 | 11/2005 | Stell et al. | |
| 2006/0086253 A1 | 4/2006 | Gaur et al. | |

OTHER PUBLICATIONS

Extended European Search Report issued Feb. 6, 2012 in corresponding European application No. 09798634.3 (4 pages).

Correspondence reporting an Official Action issued by the Eurasian Patent Office on Aug. 13, 2012 in corresponding application No. 201170195 (12 pages).

* cited by examiner

OIL VAPOR CLEANER

BACKGROUND OF DISCLOSURE

1. Field of the Disclosure

Embodiments disclosed herein relate generally to an apparatus for separating solids from a vapor stream. In another aspect, embodiments disclosed herein relate to a process for separating solids from a vapor. In yet another aspect, embodiments disclosed herein relate to a system for separating solids, water, and volatile organic compounds from a vapor stream.

2. Background

Increasing attention has been given to public health consequences resulting from the introduction of industrial wastes, e.g., halogenated and non-halogenated organic compounds, into the environment. Incident with this attention have come governmental regulations that have been put in place to mandate the removal of such industrial wastes to maximum permissible residual levels in soils and other matrices prior to disposal.

Processes for removal of the organic compounds include volatilizing the organic compounds at temperatures below that which are used for incineration. Such thermal phase separation systems are disclosed in, for example, U.S. Pat. Nos. 4,864,942 and 6,399,851 and U.S. Patent Application Publication No. 20040204308. The thermal phase separation results in the volatilization of water and hydrocarbons, thus producing a soil or solid matrix essentially free of organic compounds and water.

To enhance the thermal phase separation, the soil or solid matrix is typically agitated, such as through use of an augur, a rotating vessel (e.g., a cement mixer), or other means for agitating solids. The agitation, however, often results in carry over of particulate solids with the produced vapor.

Accordingly, there exists a need for improved processes and apparatus for the recovery of volatile organic compounds from a solid-vapor mixture.

SUMMARY OF THE DISCLOSURE

In one aspect, embodiments disclosed herein relate to a process for separating solids from a vapor, the process including: feeding a vapor mixture including hydrocarbons and entrained solids to an inlet of a solids separation device, the solids separation device including: a cylindrical portion on top of an angled portion, wherein the inlet is located in the cylindrical portion for introducing a solid-vapor mixture tangentially to the cylindrical portion; an indirect heat exchange device disposed concentrically within the cylindrical portion, thereby providing an annulus for flow of the mixture; a heat exchange device disposed at an exterior of the angled portion; at least one inlet nozzle disposed in a top of the solids separation device; an outlet located at a bottom of the angled portion; spraying a hydrocarbon fluid through the at least one inlet nozzle into the vessel, thereby forming a thin film of hydrocarbon fluid on the indirect heat exchange device; condensing at least a portion of the hydrocarbons in at least one of the cylindrical portion and the angled portion, thereby forming a film of hydrocarbon fluid on an interior surface of at least one of the cylindrical portion and the conical portion; contacting the solids with at least one of the hydrocarbon film on the cylindrical portion, the hydrocarbon film on the angled portion and the hydrocarbon film on the indirect heat exchange device; recovering a vapor having a reduced solids content and a hydrocarbon-solid mixture via the outlet located at the bottom of the angled portion.

In another aspect, embodiments disclosed herein relate to an apparatus for the recovery of solids from a vapor, the apparatus including: a vessel comprising a cylindrical portion on top of an angled portion; a vapor inlet located in the cylindrical portion for introducing a solid-vapor mixture tangentially to the cylindrical portion; at least one inlet nozzle disposed in a top of the vessel for spraying a hydrocarbon fluid into the vessel; an indirect heat exchange device disposed concentrically within the cylindrical portion, thereby providing an annulus for vapor and hydrocarbon flow; a heat exchange device disposed at an exterior of the angled portion; an outlet located at a bottom of the angled portion to recover the vapor having a reduced solids content and a solid-hydrocarbon mixture.

In another aspect, embodiments disclosed herein relate to a process for treating a mixture including solids and organic compounds, the process including: thermally treating a solid-hydrocarbon mixture to volatilize the hydrocarbons and produce a vapor mixture comprising the volatilized hydrocarbons and entrained solids; feeding the vapor mixture to an inlet of a solids separation device, the solids separation device including: a cylindrical portion on top of an angled portion, wherein the inlet is located in the cylindrical portion for introducing a solid-vapor mixture tangentially to the cylindrical portion; an indirect heat exchange device disposed concentrically within the cylindrical portion, thereby providing an annulus for flow of the mixture; a heat exchange device disposed at an exterior of the angled portion; at least one inlet nozzle disposed in a top of the solids separation device; an outlet located at a bottom of the conical portion; spraying a hydrocarbon fluid through the at least one inlet nozzle into the vessel; forming a film of hydrocarbon fluid on the indirect heat exchange device; forming a film of hydrocarbon fluid on an interior surface of at least one of the cylindrical portion and the angled portion; contacting the solids with at least one of the hydrocarbon film on the cylindrical portion, the hydrocarbon film on the angled portion, the hydrocarbon film on the indirect heat exchange device, and a hydrocarbon spray; recovering a vapor having a reduced solids content and a hydrocarbon-solid mixture via the outlet located at the bottom of the angled portion; separating the vapor having a reduced solids content from the hydrocarbon-solid mixture.

Other aspects and advantages will be apparent from the following description and the appended claims.

DETAILED DESCRIPTION

In one aspect, embodiments disclosed herein relate to a device for separating solids from a vapor stream. In another aspect, embodiments disclosed herein relate to a process for separating solids from a vapor. In yet another aspect, embodiments disclosed herein relate to a system for separating solids, water, and volatile organic compounds from a vapor stream.

Figure 1:
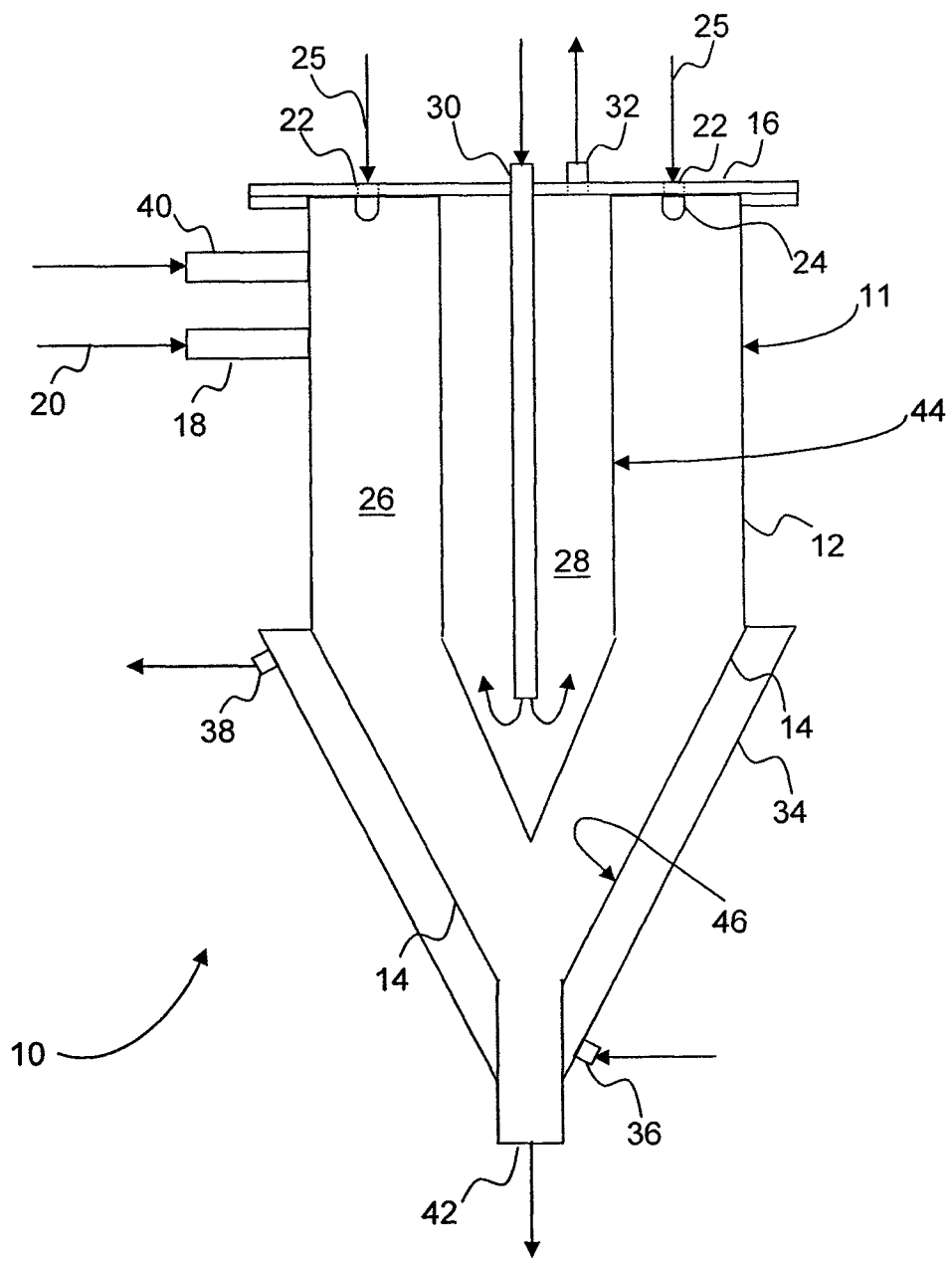
FIG. 1 is a simplified schematic drawing of a solid-gas separator according to embodiments disclosed herein.

Referring now to FIG. 1, a schematic drawing of an apparatus 10 for separating solids from a vapor stream according to embodiments disclosed herein is illustrated. Apparatus 10 may include a vessel 11 having a cylindrical top portion 12 located on top of an angled bottom portion 14. Vessel 11 may also include a vessel top 16.

Angled bottom portion 14 may include, for example, conical, pyramidal, and other similarly angled geometrical configurations. In certain embodiments, angled bottom portion 14 may be conical. Where angled bottom portion 14 is not conical, vessel 11 may include a transition area (not shown) to adjoin top portion 12 with angled bottom portion 14.

A vapor stream, including entrained solids, may be fed to vessel inlet 18 via flow line 20. Feed port 18, for example, may be a tangential feed inlet, thereby promoting the cyclonic flow of solids and vapors introduced via flow line 20. Flow line 20, for example, may be a vapor stream from a thermal phase separator. Vessel 11 may also include one or more feed inlets 22 located in top 16. Feed inlets 22 may terminate, for example, at spray nozzles 24, provided for the introduction of a liquid, fed via flow lines 25, to the interior 26 of cylindrical section 12. The liquid fed via inlets 22 may include water or hydrocarbons; in some embodiments, such as where the solids are hydrophobic, a high boiling point hydrocarbon (having a boiling point greater than about 105° C.) may be used.

Indirect heat exchange device 28 may be disposed concentrically within at least the cylindrical portion 12, providing an annulus for flow of materials between the interior of vessel 11 and the exterior surface 44 of indirect heat exchange device 28. Indirect heat exchange device 28 may include an inlet 30 and an outlet 32 for circulation of a heat exchange medium, such as water, brine, glycol, or other heat exchange fluids and gases as known in the art.

A heat exchange device 34 may also be disposed around angled portion 14, providing for additional heat exchange with the contents within vessel 11. Heat exchange device 34 may include an inlet 36 and an outlet 38 for circulation of a heat exchange medium, such as water, brine, glycol, or other heat exchange fluids and gases as known in the art. Heat exchange device 34 may include, for example, a jacket formed around angled portion 14, heat tracing surrounding angled portion 14, such as heat exchange coils, or other means for indirect heat exchange.

Optionally, vessel 11 may include a feed port 40 located in cylindrical section 12 for the introduction of additional liquids to vessel 11. Feed port 40 may be located above the vapor inlet 18 in some embodiments. The solids, vapors, and liquids fed to vessel 11 may be recovered via outlet 42.

The above-described apparatus may be used to separate the solids from the vapor in stream 20. For example, a solid-vapor mixture at an elevated temperature may be fed to vessel 11 via flow line 20. A liquid is also fed to vessel 11 via inlets 22 and/or 40. The temperature of the solid-vapor mixture, in some embodiments, may be sufficient to evaporate at least a portion of the liquid introduced. The heat exchange medium fed via flow line 30 may be maintained at a temperature sufficient to maintain a liquid film on at least a portion of outer surface 44 of indirect heat exchange device 28. The liquid film, for example, may result from either direct spray of liquid or condensation of evaporated liquid on outer surface 44. Additionally, a liquid film may form or be maintained on at least a portion of the interior surface 46 of angled portion 14 as a result of heat exchange with the heat exchange medium circulating in heat exchange device 34.

As mentioned above, feed port 18 may be a tangential inlet, promoting the cyclonic circulation of the solids and vapors within vessel 11. The centrifugal forces generated by the cyclonic flow forces the solids outward to the interior surface of vessel 11. As the solids traverse down the vessel and accumulate at the interior vessel wall, the solids then contact the liquid film on interior surfaces 11 and 46, thereby separating the solids from the vapor phase. These solids are then carried by the liquid film down the angled portion 14 and to outlet 42.

A portion of the vapor and solids fed via feed port 18, in some embodiments, may directly or indirectly contact indirect heat exchange device 28, resulting in exchange of heat as well as transfer of solids from the vapor phase to the liquid film coating outer surface 44 of indirect heat exchange device 28. These solids are then carried by the liquid film down outer surface 44 and to outlet 42. Additional solids may be transferred to the liquid phase by contact with the liquid mist introduced via nozzles 24 and 40.

As a result of the above described separations, a liquid-solid and vapor mixture may be recovered from outlet 42, where the vapor has a reduced temperature, as a result of heat exchange with heat exchange devices 28 and 34, and a reduced solids content, as a result of the solids accumulating in the liquid phase.

The resulting liquid-solid and vapor mixture may then be processed, for example, to separate the vapor from the solids and liquids. In some embodiments, at least a portion of the recovered liquid mixture may be recycled as the liquid introduced via inlets 22 and/or 40. In other embodiments, such as where the vapor feed contains condensable components, at least a portion of the condensable components may be condensed and recovered with the liquid mixture.

Figure 2:
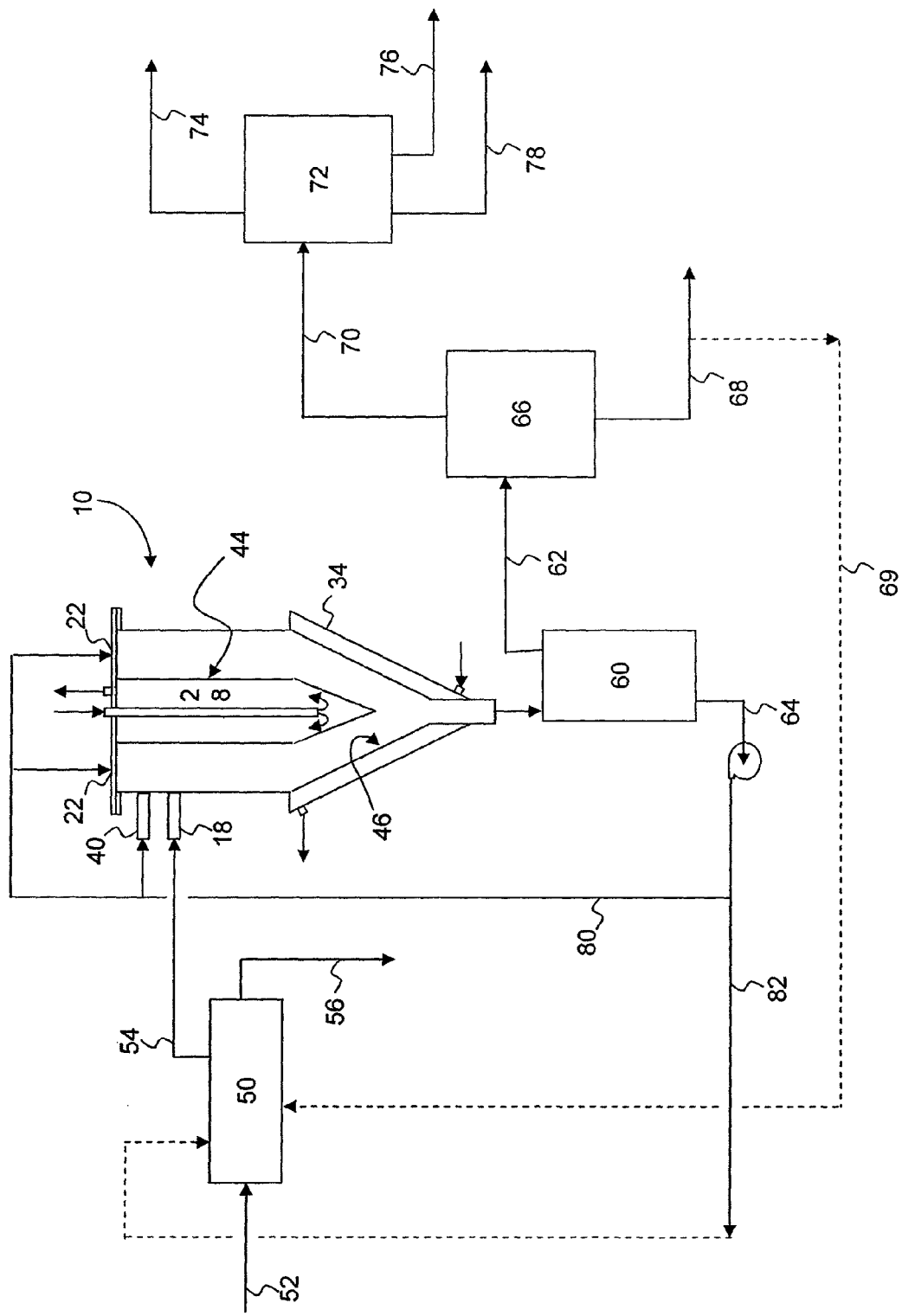
FIG. 2 is a simplified flow diagram illustrating a thermal desorption unit including a solid-gas separator according to embodiments disclosed herein.

Referring now to FIG. 2, a simplified flow diagram of a process incorporating the above-described apparatus for separating solids and liquids, according to embodiments disclosed herein, is illustrated, where like numerals represent like parts. A mixture, including solids, volatile organic compounds, and optionally water, may be fed to a thermal phase separation device 50 via flow line 52. Heat may be applied to the mixture to increase the temperature of the mixture to cause at least a portion of the volatile organic compounds to evaporate and desorb from the solids. For example, the mixture may be heated to a temperature in the range from about 200° C. to about 700° C., such as about 300° C. to about 350° C. The mixture may also be agitated to facilitate transport of the mixture, removal of the volatilized compounds, and distribution of the heat input, such as by use of an augur, rotation of the thermal phase separation chamber, or by other agitation and transportation means known to those skilled in the art (not illustrated). The volatilized vapors may then be recovered via flow line 54, and the solids, having a reduced concentration of organic compounds, may be recovered via flow line 56. The heating and agitation of the solids may also cause dusting within the phase separation device, and a portion of the solids may be entrained with the vapors recovered via flow line 54.

The vapor in flow line 54 may then be fed to a solids separation device 10 as described above via inlet 18. A hydrocarbon feed may also be introduced via inlets 22 and/or 40. As described above, a portion of the hydrocarbon feed may evaporate due to direct heat exchange with the vapor feed, and a portion of the hydrocarbon feed may form a film on surfaces 44, 46, facilitating transfer of the solids from the vapor phase to the liquid phase to result in a vapor phase having a reduced solids content. In some embodiments, the vapor phase may be essentially free of solids.

Indirect heat transfer with heat exchange devices 28, 34 and direct heat exchange with the hydrocarbon feed contribute to decreasing the temperature of the vapor. In some embodiments, the liquid-solid and vapor mixture recovered via flow line 42 may be at a temperature in the range from about 105° C. to about 175° C.; in the range from about 110° C. to about 160° C. in other embodiments; and in the range from about 115° C. to about 145° C., such as about 135° C., in yet other embodiments.

In some embodiments, the decrease in temperature of the vapor feed may result in the condensation of at least a portion of the organic compounds contained in the vapor feed, where the separations in apparatus 10 result in a vapor phase having a reduced solids content and a reduced organic compound content. In other embodiments, the volatile organic compounds, or a substantial portion thereof, may remain as a vapor to facilitate recovery of the organic compounds free of solids in a downstream unit, discussed below.

The vapor, having a reduced solids content, and the hydrocarbon-solid mixture recovered via outlet 42 may then be fed to a separation device 60 to separate the vapor from the solid-hydrocarbon mixture. Separation device 60 may be, for example, a collection vessel, a settling tank, or other vessels or processes commonly used to separate a liquid from a vapor. The vapor may be recovered via flow line 62, and the hydrocarbon-solid mixture may be recovered via flow line 64.

The vapor recovered via flow line 62, including volatile organic compounds, may then be reduced in temperature in organic compound recovery system 66, such as to a temperature within the range from 25° C. to about 135° C.; to a temperature within the range from about 90° C. to about 115° C. in other embodiments; and to a temperature within the range from about 105° C. to about 115° C. in yet other embodiments. The temperature, and corresponding pressure, may be sufficient to condense at least a portion of the organic compounds while maintaining any water present in the vapor phase. The condensed organic compounds may then be recovered via flow line 68 and the remaining vapors may be recovered via flow line 70.

The remaining vapors recovered via flow line 70 may then be processed via recovery system 72 to condense and recover the remaining hydrocarbons and any water that may be present. The remaining vapors, essentially free of organic compounds, may be recovered via flow line 74. The water and organic compounds may be recovered as a single stream, or may be separated within recovery system 72 to produce a water stream essentially free of organic compounds recovered via flow line 76 and an organic compound stream recovered via flow line 78.

In some embodiments, the organic compounds recovered via flow lines 68, 78 may be collected for disposal, sale, or otherwise processed. In a family of embodiments, at least a portion of the organic compounds recovered via flow lines 68, 78 may be used as a fuel to generate heat in thermal separation device 50. In some embodiments, at least a portion of the condensed organic compounds recovered via flow line 68 may be fed via flow line 69 to separation device 50 as a fuel for generating at least a portion of the heat required for the separation process.

Figure 3:
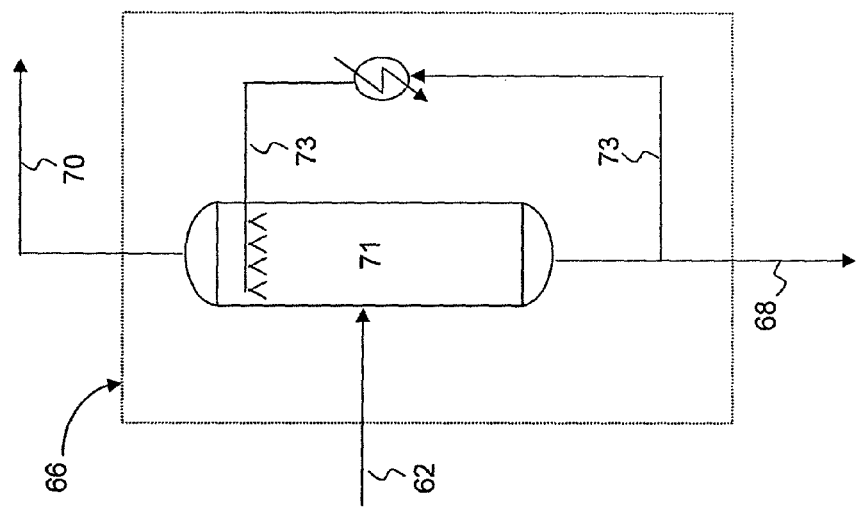
FIG. 3 is a simplified flow diagram of an organic compound recovery system useful in embodiments of the thermal desorption unit illustrated in FIG. 2.

For example, one embodiment of organic compound recovery system 66 is illustrated in FIG. 3. Vapor may be fed via flow line 62 to one or more gas-liquid contactors 71, such as a spray cooler, a scrubber, a vertical spray tower, or the like, where the vapor may be contacted with a contact liquid introduced via line 73, thereby condensing at least a portion of the vapor. The condensate and the contact liquid may be recovered via flow line 68, which may be further processed as described above. At least a portion of the liquid recovered via flow line 68 may be cooled via indirect heat exchange and recycled via flow line 73 as the contact liquid. Non-condensed vapors may be recovered from gas-liquid contactor 71 via flow line 70.

As mentioned above, it may be desired to operate gas-liquid contactor 71 at a temperature sufficient to condense only a portion of the vapors, such as to maintain any water in the system as a vapor. Additionally, such as when using a portion of the condensate recovered via flow line 68 as a fuel for separation device 50, it may be desired to operate gas-liquid contactor 71 at a temperature sufficient to condense and collect a specific hydrocarbon fraction for use as the fuel. In some embodiments, the hydrocarbon fraction used as a fuel may be a heavy hydrocarbon cut, such as from a first gas-liquid contactor 71. In other embodiments, the hydrocarbon fraction used as a fuel may be an intermediate or light hydrocarbon cut, such as from a second or subsequent gas-liquid contactor 71.

Referring back to FIG. 2, the solid-hydrocarbon mixture recovered via flow line 64 may be fed via flow line 80 as the hydrocarbon feed to inlets 22, 40 in some embodiments. In such embodiments, at least a portion of the hydrocarbon-solid mixture may be purged via flow line 82 so as to avoid excess accumulation of solids and/or liquids within the hydrocarbon-solid mixture. In yet other embodiments, the purged hydrocarbon-solid mixture may be returned via flow line 82 to the thermal phase separation device 50 to separate the solids and the liquids, enhancing the recovery of the solids and avoiding unnecessary disposal costs.

Figure 4:
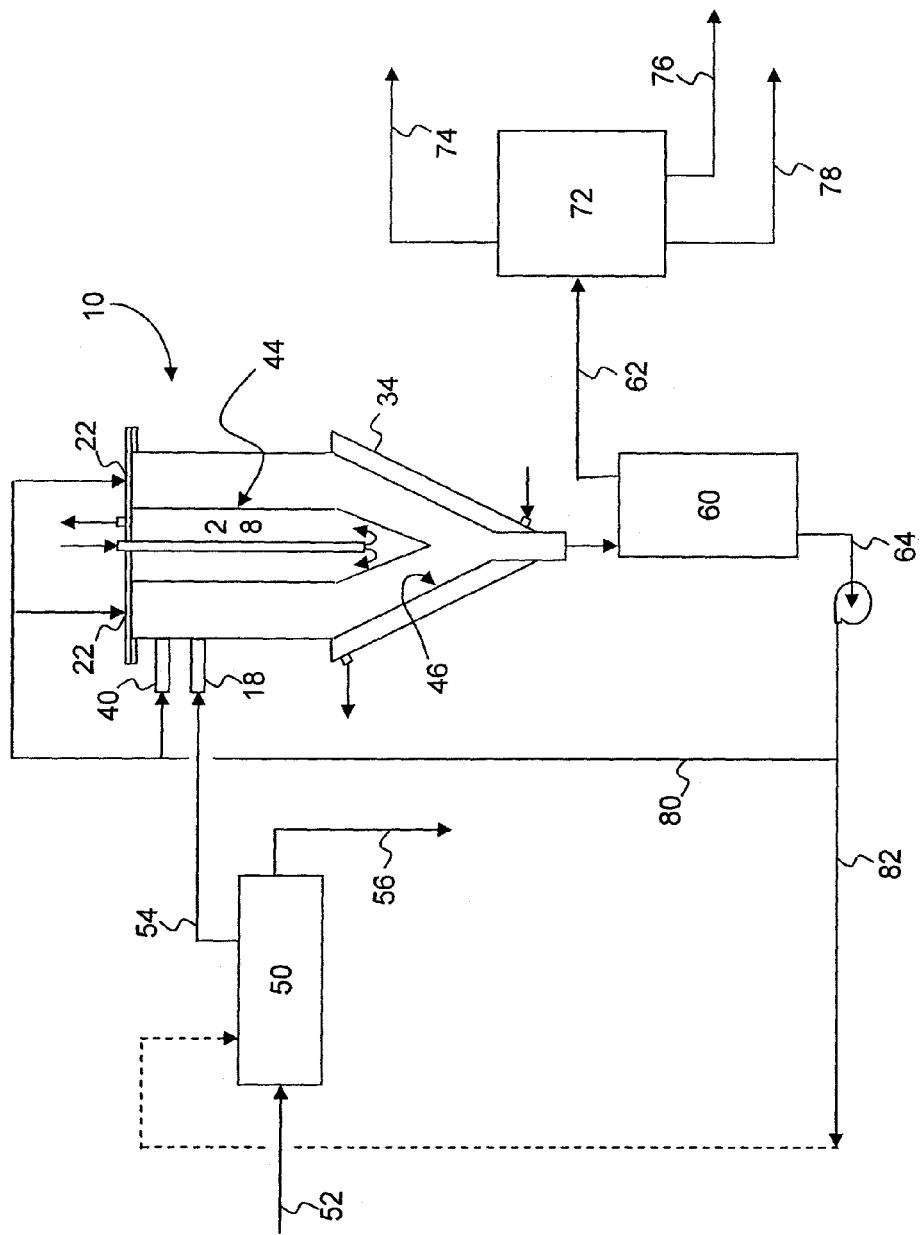
FIG. 4 is a simplified flow diagram illustrating a thermal desorption unit including a solid-gas separator according to embodiments disclosed herein.

Referring now to FIG. 4, a simplified flow diagram of a process incorporating the above-described apparatus for separating solids and liquids, according to embodiments disclosed herein, is illustrated, where like numerals represent like parts. In this embodiment, the vapor recovered via flow line 62 may be fed directly to recovery system 72 to condense and recover the hydrocarbons and any water that may be present. As above, vapors, essentially free of organic compounds, may be recovered via flow line 74. The water and organic compounds may be recovered as a single stream, or may be separated within recovery system 72 to produce a water stream essentially free of organic compounds recovered via flow line 76 and an organic compound stream recovered via flow line 78.

Figure 5:
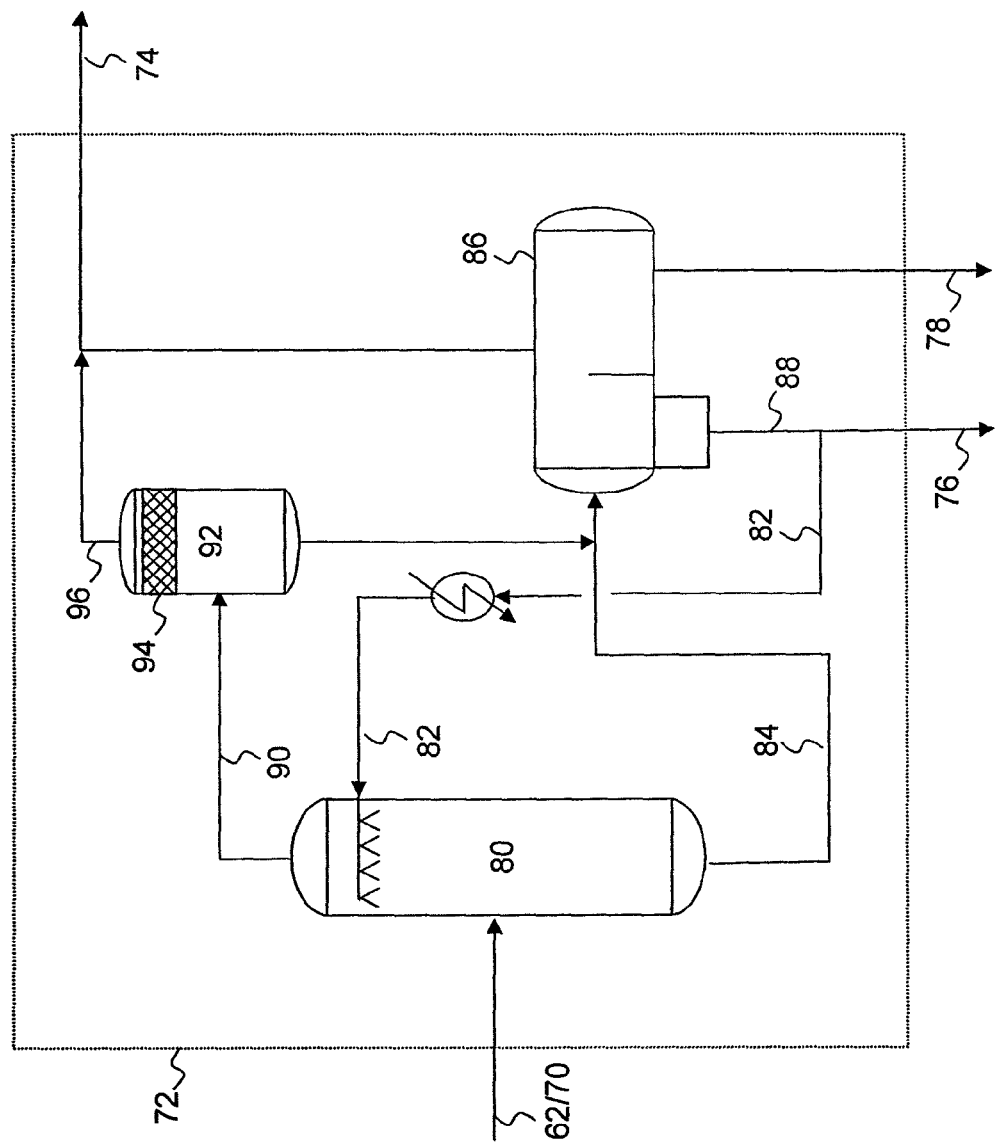
FIG. 5 is a simplified flow diagram of an organic/water recovery system useful in embodiments of the thermal desorption units illustrated in FIG. 2 and FIG. 4.

In the above described embodiments, water and organic compounds may be recovered as a single stream, or may be separated within recovery system 72 to produce a water stream essentially free of organic compounds recovered via flow line 76 and an organic compound stream recovered via flow line 78. FIG. 5 illustrates one such embodiment for separating and recovering the water and organic compounds.

In FIG. 5, a mixed vapor stream, including organic compounds and water vapor, such as stream 62 (for a two-stage process, such as illustrated in FIG. 4) or stream 70 (for a three-stage process, such as illustrated in FIG. 2) may be fed to recovery system 72 for separation and recovery of the water and the organic compounds. Vapor stream may be fed via flow line 62/70 to one or more gas-liquid contactors 80, such as a spray cooler, a scrubber, a vertical spray tower, or the like, where the vapor may be contacted with a contact liquid introduced via line 82, thereby condensing at least a portion of the vapor. The condensate and the contact liquid may be recovered via flow line 84, which may be fed to an oil-water separator 86.

The organic compounds may be recovered from oil-water separator 86 via flow line 78. The aqueous phase, substantially free of organic compounds, may be recovered from oil-water separator 86 via flow line 88. A portion of the aqueous phase may be recycled to gas-liquid contactor 80 via flow line 82. The remainder of the aqueous phase may be recovered via flow line 76 for disposal, treatment, or other use.

Vapors not condensed in gas-liquid contactor 80 may be fed via flow line 90 to a mist extractor 92, where the vapors may be contacted with mist eliminators, de-entrainment devices, or other structures 94 to collect liquid droplets entrained with the vapor. Any liquid recovered by mist extractor 92 may be combined with the condensate from gas-liquid contactor 80 for separation in oil-water separator 86.

The remaining vapor, having been treated to remove entrained solids and condensable oil and water, may then be recovered from mist extractor 92 via flow line 96. The vapors may then be combined with any vapors recovered from oil-water separator 86 and fed via flow line 74 to a thermal oxidizer (not shown) or other typical off-gas or waste-gas treatment processes.

In some embodiments, the solids separation system and the associated systems for recovering the organic compounds and water from the vapor may be mounted on a skid, such as a standard ISO Transportation Container for ease of transport to and from various locations. One separation skid may be used to treat the vapors from one or more thermal separation units; for example, vessel 11 may include two or more inlets 18 for accepting vapor-solid mixtures from two or more thermal separation units 50.

The condensation of liquids and cooling of vapors through the separation train may result in the formation of a slight vacuum within the separation system (vessel 11 and systems 60, 66, and 72). The resulting vacuum may provide for the transportation of vapors from the thermal phase separation unit 50 to vessel 11. If necessary, a vacuum or blower may be used, such as on flow line 74, to provide sufficient driving force for the transport of vapors through the separation system.

As described above, an apparatus for the separation of solids from a vaporous mixture is disclosed, where the formation of a liquid film on an internal heat exchange device and on the conical portion of the separation vessel facilitate the removal of the solids from the vapor. The apparatus may be useful, for example, in the recovery of organic compounds from a vapor phase generated in a thermal phase separation system, where the organic compounds are essentially free of solids.

Advantageously, embodiments disclosed herein may provide for the efficient recovery of solids from a vaporous mixture. The separation apparatus described herein may provide for the separation of solids from a vapor mixture under controlled conditions so as to result in a vapor stream essentially free of solids.

The vapor stream may then be processed in additional separation stages to advantageously provide for the recovery of the organic compounds, water, and vapor, where each are essentially free of solids. Additionally, the multiple stage separation may advantageously provide for the recovery of a vapor phase essentially free of organic compounds, meeting governmental standards for emissions.

Additionally, embodiments disclosed herein provide for the recycle and reuse of the organic compounds recovered. For example, a portion of the organic compounds may be condensed and used as the hydrocarbon liquid feed to the solids separation device. As another example, the organic compounds recovered may be used as a fuel for the thermal separation system. Such uses may facilitate the use of a thermal phase separation system in remote locations where collection, disposal, and/or sale of the organic compounds is not easily accomplished.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for separating solids from a vapor, the process comprising:
   feeding a vapor mixture comprising hydrocarbons and entrained solids to an inlet of a solids separation device, the solids separation device comprising:
      a cylindrical portion on top of an angled portion, wherein the inlet is located in the cylindrical portion for introducing a solid-vapor mixture tangentially to the cylindrical portion;
      an indirect heat exchange device disposed concentrically within the cylindrical portion, thereby providing an annulus for flow of the mixture;
      a heat exchange device disposed at an exterior of the angled portion;
      at least one inlet nozzle disposed in a top of the solids separation device;
      an outlet located at a bottom of the angled portion;
   spraying a hydrocarbon fluid through the at least one inlet nozzle into the vessel, thereby forming a thin film of hydrocarbon fluid on the indirect heat exchange device;
   condensing at least a portion of the hydrocarbons in at least one of the cylindrical portion and the angled portion, thereby forming a film of hydrocarbon fluid on an interior surface of at least one of the cylindrical portion and the conical portion;
   contacting the solids with at least one of the hydrocarbon film on the cylindrical portion, the hydrocarbon film on the angled portion and the hydrocarbon film on the indirect heat exchange device;
   recovering a vapor having a reduced solids content and a hydrocarbon-solid mixture via the outlet located at the bottom of the angled portion.

2. The process of claim 1, further comprising separating the hydrocarbon solid mixture from the vapor having a reduced solids content.

3. The process of claim 1, further comprising recycling at least a portion of the hydrocarbon-solid mixture as the hydrocarbon fluid spray.

4. An apparatus for the recovery of solids from a vapor, the apparatus comprising:
   a vessel comprising a cylindrical portion on top of an angled portion;
   a vapor inlet located in the cylindrical portion for introducing a solid-vapor mixture tangentially to the cylindrical portion;
   at least one inlet nozzle disposed in a top of the vessel for spraying a hydrocarbon fluid into the vessel;
   an indirect heat exchange device disposed concentrically within the cylindrical portion, thereby providing an annulus for vapor and hydrocarbon flow;
   a heat exchange device disposed at an exterior of the angled portion;
   an outlet located at a bottom of the angled portion to recover the vapor having a reduced solids content and a solid-hydrocarbon mixture.

5. The apparatus of claim 4, further comprising:
a hydrocarbon fluid inlet located in an upper portion of the cylindrical portion for introducing the hydrocarbon fluid tangentially to the cylindrical portion.

6. The apparatus of claim 4, wherein the heat exchange device comprises a heat exchange jacket disposed around the conical portion.

7. The apparatus of claim 4, wherein the heat exchange device comprises at least one of a heat exchange jacket disposed around, or heat exchange coils tracing, an outer periphery of the angled portion.

8. The apparatus of claim 4, comprising at least two inlet nozzles disposed in the top of the vessel for spraying a hydrocarbon into the vessel.

9. The apparatus of claim 4, wherein the angled portion is conical.

10. A process for treating a mixture including solids and organic compounds, the process comprising:
thermally treating a solid-hydrocarbon mixture to volatilize the hydrocarbons and produce a vapor mixture comprising the volatilized hydrocarbons and entrained solids;
feeding the vapor mixture to an inlet of a solids separation device, the solids separation device comprising:
a cylindrical portion on top of an angled portion, wherein the inlet is located in the cylindrical portion for introducing a solid-vapor mixture tangentially to the cylindrical portion;
an indirect heat exchange device disposed concentrically within the cylindrical portion, thereby providing an annulus for flow of the mixture;
a heat exchange device disposed at an exterior of the angled portion;
at least one inlet nozzle disposed in a top of the solids separation device;
an outlet located at a bottom of the conical portion;
spraying a hydrocarbon fluid through the at least one inlet nozzle into the vessel;
forming a film of hydrocarbon fluid on the indirect heat exchange device;
forming a film of hydrocarbon fluid on an interior surface of at least one of the cylindrical portion and the angled portion;
contacting the solids with at least one of the hydrocarbon film on the angled portion, the hydrocarbon film on the cylindrical portion, the hydrocarbon film on the indirect heat exchange device, and a hydrocarbon spray;
recovering a vapor having a reduced solids content and a hydrocarbon-solid mixture via the outlet located at the bottom of the angled portion;
separating the vapor having a reduced solids content from the hydrocarbon-solid mixture.

11. The process of claim 10, further comprising recycling at least a portion of the hydrocarbon-solid mixture as the hydrocarbon fluid spray.

12. The process of claim 10, further comprising recycling at least a portion of the hydrocarbon-solid mixture to the thermally treating.

13. The process of claim 10, further comprising condensing at least a portion of the vapor having a reduced solids content to form a liquid condensate.

14. The process of claim 10, wherein the solid-hydrocarbon mixture further comprises water and wherein the vapor mixture further comprises water vapor, the process further comprising condensing at least a portion of the vapor having a reduced solids content to form a liquid condensate comprising at least one of hydrocarbons and water.

15. The process of claim 14, wherein the liquid condensate comprises hydrocarbons and water, the process further comprising separating liquid condensate hydrocarbons from liquid condensate water.

16. The process of claim 10, further comprising condensing additional hydrocarbons from the vapor having a reduced solids content to produce a vapor having a reduced hydrocarbon content; and optionally recycling at least a portion of the additional hydrocarbons as a fuel for the thermally treating.

17. The process of claim 16, wherein the condensing hydrocarbons comprises reducing the temperature of the recovered vapor to a temperature within the range from about 25 to about 135° C.

18. The process of claim 16, wherein the solid-hydrocarbon mixture further comprises water and wherein the vapor mixture further comprises water vapor, the process further comprising condensing water from the vapor having a reduced hydrocarbon content to produce a vapor having a reduced water content.

19. The process of claim 10, wherein the vapor mixture comprising the volatilized hydrocarbons and entrained solids is at a temperature within the range from about 200° C. to about 700° C., the process further comprising feeding a heat exchange medium to at least one of the heat exchange device and the indirect heat exchange device and reducing the temperature of the vapor mixture such that the recovered vapor having a reduced solids content and the hydrocarbon-solid mixture are at a temperature within the range from about 105° C. to about 175° C.

20. The process of claim 10, wherein the angled portion is conical.

* * * * *